United States Patent [19]

Stevels et al.

[11] 4,075,495
[45] Feb. 21, 1978

[54] X-RAY LUMINESCENT SCREEN

[75] Inventors: Albert Leendert Nicolaas Stevels; Agnes Desiree Maria Schrama-de Pauw, both of Eindhoven, Netherlands

[73] Assignee: U.S. Philips Corporation, New York, N.Y.

[21] Appl. No.: 616,052

[22] Filed: Sept. 23, 1975

[30] Foreign Application Priority Data

Oct. 1, 1974 Netherlands .......................... 7412918

[51] Int. Cl.$^2$ .................... G01N 23/223; G01T 1/00; C09K 11/46
[52] U.S. Cl. .......................... 250/483; 252/301.4 H; 428/539
[58] Field of Search ................... 252/301.4 H, 301.4 S; 250/483; 428/539

[56] References Cited

U.S. PATENT DOCUMENTS

| | | | |
|---|---|---|---|
| 2,522,074 | 9/1950 | Urbach | 252/301.4 S |
| 3,163,610 | 12/1964 | Yocom | 252/301.4 H |
| 3,657,141 | 4/1972 | Chenot | 252/301.4 H |

FOREIGN PATENT DOCUMENTS 7,206,945   11/1973   Netherlands.

OTHER PUBLICATIONS

Feofilov "Chem. Abstract", vol. 57, 1962; 5442e.

Primary Examiner—Jack Cooper
Attorney, Agent, or Firm—Frank R. Trifari; Norman N. Spain

[57] ABSTRACT

Luminescent screen, in particular X-ray image intensifier screen, provided with a luminescent alkaline earth metal fluoro-halide which is activated by $Eu^{2+}$, contains samarium and has a composition defined by the formula $Me_{1-p-q}Eu_pSm_qFX$, where Me represents barium and/or strontium and X represents chlorine, bromine and/or iodine. Up to 20 mol % of the Ba and/or Sr can be replaced by Ca. Furthermore $0.001 \leq p \leq 0.20$; $0.001 \leq q \leq 0.10$; $0.02 \leq q/p \leq 0.50$.

5 Claims, 1 Drawing Figure

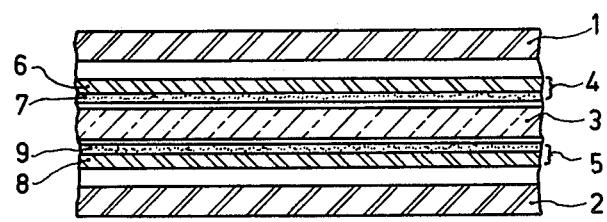

X-RAY LUMINESCENT SCREEN

The invention relates to a luminescent screen provided with a luminescent alkaline earth metal fluorohalide activated by bivalent europium. The invention relates in particular to such a screen in the form of an X-ray image intensifier screen and to the luminescent alkaline earth metal fluorohalide itself.

The said alkaline earth metal fluorohalide may be defined by the general formula MeFX, where Me represents one or more of the alkaline earth metals Ba and Sr, and X represents one or more of the halogens Cl, Br and I. The crystal structure of these materials is known as the PbFCl structure and has tetragonal symmetry. From Netherlands patent application No. 7,206,945 it is known that these fluorohalides are highly efficient luminescent materials when activated by bivalent europium. The europium replaces part of the alkaline earth metal in the fluorohalide base lattice. The known luminescent fluorohalides can very satisfactorily be excited both by ultraviolet radiation and by electrons and X-rays. The spectral distribution of the emitted radiation consists of a narrow band (half-value width approximately 30 nm) the maximum of which generally lies at about 380 nm. For the materials which contain a considerably quantity of iodine the emission maximum is shifted to longer wavelengths. Specifically for the fluoro-iodide this maximum is found at approximately 410 nm. It was found that in these materials up to 20 mol % of the Ba and Sr represented by Me can be replaced by Ca whilst retaining the crystal structure.

An important use of the known fluorohalides activated by bivalent europium is found in the so-called X-ray image intensifier screens. Such intensifier screens comprise a material which luminesces under X-ray irradiation and serve to shorten the exposure time when taking X-ray images on photographic material. In general they take the form of film cassettes which contain a support which is coated with the luminescent material and, during the taking of the X-ray image, is in contact with the photographic film. The known luminescent fluoro-halides when excited by X-rays have a very high luminous flux which may be up to 5 times that of the known calcium tungstate which is frequently used in X-ray image intensifier screens.

A serious disadvantage of the known fluorohalides activated by bivalent europium, in particular when these materials are used in X-ray image intensifier screens, is that they have a high afterglow level. This means that on cessation of the excitation the materials show an afterglow of comparatively high intensity for a comparatively long time. The said afterglow level for these materials may be, for example, from 20 to 100 times that of the known calcium tungstate. Afterglow of the luminescent material in an intensifier screen is particularly inconvenient because for some time after exposure any movement of the screen relative to the photographic film (for example when opening film cassettes) results in a blurred image. An even more serious drawback is that owing to the afterglow considerable waiting times have to be observed before a new film can be placed in the cassette.

It is an object of the present invention to provide a luminescent screen which contains a fluoro-halide activated by bivalent europium the afterglow level of which is appreciably reduced.

A luminescent screen according to the invention is provided with a luminescent alkaline earth metal fluorohalide activated by bivalent europium and is characterized in that the fluoro-halide contains samarium and has a composition defined by the formula $Me_{1-p-q}Eu_pSm_qFX$, where Me represents at least one of the alkaline earth metals Ba and Sr whilst up to 20 mol % of these metals can be replaced by Ca, and X represents at least one of the halogens Cl, Br and I and $0.001 \leq p \leq 0.20$, $0.0001 \leq q \leq 0.10$ and $0.02 \leq q/p \leq 0.50$.

It was found unexpectedly that the addition of a small quantity of samarium to the fluoro-halide produces a considerable drop of the afterglow level of the luminescent material. Experiments have shown that the afterglow level of $CaWO_4$ or even a lower level can be reached so that the high luminous flux of the materials according to the invention can be fully utilized. In the materials according to the invention the samarium, just like the europium activator, replaces part of the alkaline earth metal in the fluorohalide lattice. An advantage of the materials according to the invention is that the efficiency of these materials is not, or only slightly, reduced by the addition of samarium. It should be mentioned that it is known to activate alkaline earth metal fluoro-halides with rare earth elements. German Pat. No. 1,215,257 describes inter alia the use of samarium in the said base lattices. In the materials described the samarium has the function of an activator and hence on excitation the characteristic samarium emission in the spectral range between about 550 nm and 850 nm is obtained. In the materials according to the invention which have a composition defined by the above general formula and satisfy the above conditions the samarium serves only to reduce the afterglow level and it is found that the samarium emission does substantially not occur. The effect of the samarium in the materials according to the invention was entirely unpredictable. Furthermore experiments have shown that other rare earth elements than samarium do not produce the desired reduction of the afterglow level.

Like the fluoro-halides described in the aforementioned Netherlands patent application No. 7,206,945 the materials according to the invention have a europium content $p$ which lies between the values 0.001 and 0.20 and a calcium content which is at most 20 mol % of the total quantity of Me. As will be seen from the above formula and conditions, the samarium content $q$ of the materials of the invention is selected to lie between 0.0001 and 0.10, for values of $q$ of less than 0.0001 give too small a reduction of the afterglow level and values of $q$ greater than 0.10 give an unacceptable reduction of the efficiency of the europium emission of the luminescent material. For the same reason the samarium content must be smaller than the europium content; specifically the ratio $q/p$ is selected to lie between the limits 0.02 and 0.50.

Luminescent materials according to the invention in which the europium content $p$ lies between 0.01 and 0.10 and the samarium content $q$ lies between 0.001 and 0.02 are preferred, for at these values of $p$ and $q$ in general the most favourable combinations of high efficiency and low afterglow level are obtained.

A further advantageous embodiment of the invention is found in the materials defined by the general formula in which Me is mainly barium and X is mainly chlorine, for it was found that the barium fluorochloride has the best luminescent properties when used in X-ray image intensifier screens.

The luminescent fluoro-halides according to invention can be prepared in the manners known for preparing luminescent materials. For example, preparation may start from of mixture of halides which at a high temperature is converted to the desired fluorohalide by a solid-state reaction. As an alternative the materials may be obtained by coprecipitation of the halides followed by a temperature treatment.

A preferred method of preparing a luminescent fluoro-halide according to the invention is characterized in that an aqueous suspension of $MeF_2$ is made which contains 1 mol of $MeX_2$ in dissolved form per mol of $MeF_2$ and may further contain europium halide and samarium in the form of europium halide and samarium halide respectively in quantities at most equal to the quantities desired in the fluoro-halide, in that the suspension is evaporated to dryness at a temperature of 50° C to 250° C, the obtained product is mixed with the still required amount of europium halide and samarium halide, the mixture is subjected to at least one temperature treatment at 600° C to 1000° C in a weakly reducing atmosphere and the obtained reaction product after cooling is subjected to a final heat treatment at 600° C to 850° C in an inert or weakly reducing atmosphere, for such a method yields a further reduction of the afterglow level of the fluorohalides.

Embodiments of the invention will now be described with reference to the accompanying drawings the sole figure of which is a cross-sectional view of part of an X-ray film cassette provided with an X-ray image intensifier screen according to the invention, and to the following Examples.

EXAMPLE 1

A mixture is made of
8.765 g of $BaF_2$
12.240 g of $BaCl_2 \cdot 2H_2O$
1.374 g of $EuCl_3$
0.280 g of $SmCl_3$ This mixture is twice heated in a quartz crucible, both times for one hour at a temperature of 800° C in a weakly reducing atmosphere (a nitrogen stream containing 0.5 vol. % of hydrogen). The resulting product is subjected to a third temperature treatment at a temperature of 850° C, again in the said atmosphere for one hour. After cooling the product, which has a composition defined by the formula $Ba_{0.94}Eu_{0.05}Sm_{0.01}FCl$, is ready for use. If this material is used in an X-ray image intensifier screen it is found that with X-ray excitation under standard conditions a luminous flux is obtained which is twice that of the known calcium tungstate. The afterglow level of screens provided with the fluorohalide according to the invention is substantially equal to that of the $CaWO_4$ screens.

If the quantities of chlorides given 2 the above Example are replaced by equivalent quantities of bromides and the procedure described in Example 1 is followed, a material of a composition defined by the formula $Ba_{0.94}Eu_{0.05}Sm_{0.01}FBr$ is obtained. It is found this fluorobromide yields a luminous flux which is about 10% higher than that produced by the fluorochloride of Example 1, however, it has about twice as high an afterglow level.

EXAMPLE 2

A quantity of 8.765 g of $BaF_2$ is added to water and suspended by stirring. 12.240 g of $BaCl_2 \cdot 2H_2O$ are dissolved in the suspension. Then the suspension is evaporated to dryness at a temperature of 170° C. The resulting material consists of BaFCl and has the PbFCl crystal structure. The BaFCl is mixed with 1.374 g of $EuCl_3$ and 0.280 g of $SmCl_3$ and then heated at 900° C in a quartz crucible in an oven in a weakly reducing atmosphere (nitrogen containing 0.7 volume % of hydrogen) for 1 hour. After cooling the product is ground in a ball mill and then subjected to a final heat treatment at 750° C in nitrogen for 1 hour. After cooling, the product, which has a composition defined by the same formula as the product prepared by the procedure in Example 1, is ready for use. It is found that the luminous flux of the resulting luminescent material is twice that of $CaWO_4$ and the afterflow level is about equal to that of $CaWO_4$.

The drawing shows schematically a cross-sectional view of part of an X-ray film cassette provided with an X-ray image intensifier screen according to the invention. In the drawing reference numeral 1 denotes a cassette cover and 2 a cassette bottom. The cassette contains an X-ray film 3 coated with a sensitive emulsion on both sides. On either side of the film 3 lies an intensifier screen according to the invention, namely a first screen 4 and a second screen 5. The intensifier screen 4 comprises a support 6, made for example of paper, which on the surface facing the film is coated with a luminescent layer 7. The intensifier screen 5 also comprises a support 8 coated on the surface facing the film with a luminescent layer 9. The layers 7 and 9 consist of a luminescent alkaline earth metal fluorohalide activated by $Eu^{2+}$ and containing Sm according to the invention and when the X-ray image is being made contact the film 3.

What is claimed is:

1. An X-ray image intensifier screen comprising a substrate a surface of which is coated with a layer of a bivalent europium activated alkaline earth metal samarium fluoro-halide phosphor of the formula: $Me_{1-p-q}Eu_pSm_qFX$ wherein Me is at least one metal selected from the group consisting of barium, strontium and calcium with the proviso that only up to 20 mol % of Me is calcium, X is at least one halogen selected from the group consisting of chlorine, bromine and iodine and $0.001 \leq p \leq 0.20$, $0.0001 \leq q \leq 0.10$ and $0.02 \leq q/p \leq 0.50$ 2. Luminescent screen as claimed in claim 1, characterized in that $0.01 \leq p \leq 0.10$ $0.001 \leq q \leq 0.02$ 3. Luminescent screen as claimed in claim 2, characterized in that Me is mainly barium and X is mainly chlorine.

4. A bivalent europium activated alkaline earth metal samarium fluorohalide phosphor of the formula: $Me_{1-p-q}Eu_pSm_qFX$ wherein Me is at least one metal selected from the group consisting of barium, strontium and calcium with the proviso that only up to 20 mol % of Me is calcium, X is at least one halogen selected from the group consisting of chlorine, bromine and iodine and $$0.001 \leq p \leq 0.20$$

$$0.0001 \leq q \leq 0.10 \text{ and}$$

$$0.02 \leq q/p \leq 0.50$$

5. A method of preparing the phosphor of claim 4 comprising: preparing an aqueous suspension of MeF$_2$, 1 mol of MX$_2$ is dissolved form per mol of MeF$_2$, and europium and samarium in the forms of europium halide and samarium halide respectively in amounts at most equal to that desired in said phosphor evaporating the resultant suspension to dryness by heating said suspension at a temperature of 50° to 250° C, mixing the resultant product with amounts of europium halide and samarium halide required to produce said phoshor having the desired amount of europium and samarium, if the amount of europium and samarium in said suspension are less than said desired amount subjecting the resultant mixture to a heat treatment of 600° C to 1000° C in a weakly reducing atmosphere, cooling the reaction product and then finally heating the resultant product at 600° C to 850° C in an inert or weakly reducing atmosphere.

* * * * *